United States Patent
Rochelle et al.

(10) Patent No.: US 11,030,273 B2
(45) Date of Patent: Jun. 8, 2021

(54) CONVERTING SPREADSHEET APPLICATIONS TO WEB-BASED APPLICATIONS USING A DATA FILE THAT INCLUDES INTERACTIVITY ATTRIBUTES OF CELLS FOR THE WEB-BASED APPLICATIONS

(71) Applicant: GOOGLE LLC, Mountain View, CA (US)

(72) Inventors: Jonathan P. Rochelle, Chester, NJ (US); Micah Lemonik, New York, NY (US); Farzad Khosrowshahi, Pleasantville, NY (US); John Stephen Danaher, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 15/839,000

(22) Filed: Dec. 12, 2017

(65) Prior Publication Data

US 2018/0101620 A1 Apr. 12, 2018

Related U.S. Application Data

(60) Continuation of application No. 14/681,820, filed on Apr. 8, 2015, now Pat. No. 9,864,812, which is a
(Continued)

(51) Int. Cl.
*G06F 16/958* (2019.01)
*G06F 40/18* (2020.01)
(Continued)

(52) U.S. Cl.
CPC ........ *G06F 16/972* (2019.01); *G06F 21/6209* (2013.01); *G06F 40/103* (2020.01);
(Continued)

(58) Field of Classification Search
CPC .............................. G06F 21/6209; G06F 40/18
See application file for complete search history.

(56) References Cited

U.S. PATENT DOCUMENTS

| 5,220,657 A | 6/1993 | Bly et al. |
| 5,337,407 A | 8/1994 | Bates et al. |

(Continued)

FOREIGN PATENT DOCUMENTS

| EP | 1132847 A2 | 9/2001 |
| JP | 2004110714 A | 4/2004 |

(Continued)

OTHER PUBLICATIONS

Enjoy Google Earth & Maps; ASCII, Oct. 2005. (English abstract enclosed.).
(Continued)

*Primary Examiner* — Kavita Stanley
*Assistant Examiner* — Tyler Schallhorn
(74) *Attorney, Agent, or Firm* — Lowenstein Sandler LLP

(57) ABSTRACT

A method includes receiving a spreadsheet application that is executable using a spreadsheet program; converting the spreadsheet application into a data file that defines characteristics of a networked version of the spreadsheet application that was converted from the spreadsheet application by applying permissions that are set in the spreadsheet application and not applied in the spreadsheet application, wherein the characteristics are defined based on the permissions and include information defining cells of the networked version of the spreadsheet application that are displayable to a user of the networked version of the spreadsheet application; and transmitting the data file to a server to make the data file available to network users as the networked version of the spreadsheet application.

18 Claims, 13 Drawing Sheets

Related U.S. Application Data division of application No. 11/281,898, filed on Nov. 18, 2005, now Pat. No. 9,009,582.

(60) Provisional application No. 60/629,577, filed on Nov. 19, 2004.

(51) Int. Cl.
  G06F 40/103 (2020.01)
  G06F 21/62 (2013.01)
  G06F 40/14 (2020.01)
  G06F 40/154 (2020.01)

(52) U.S. Cl.
  CPC .............. G06F 40/18 (2020.01); *G06F 40/14* (2020.01); *G06F 40/154* (2020.01)

(56) References Cited

U.S. PATENT DOCUMENTS

| | | |
|---|---|---|
| 5,546,580 A | 8/1996 | Seliger et al. |
| 5,548,304 A | 8/1996 | Yoshino |
| 5,630,126 A * | 5/1997 | Redpath .................. G06F 40/166 |
| 5,890,177 A | 3/1999 | Moody et al. |
| 6,006,239 A | 12/1999 | Bhansali et al. |
| 6,023,715 A | 2/2000 | Burkes et al. |
| 6,067,551 A | 5/2000 | Brown et al. |
| 6,157,934 A | 12/2000 | Khan et al. |
| 6,161,099 A | 12/2000 | Harrington et al. |
| 6,201,859 B1 | 3/2001 | Memhard et al. |
| 6,233,600 B1 | 5/2001 | Salas et al. |
| 6,240,414 B1 | 5/2001 | Beizer et al. |
| 6,314,409 B2 * | 11/2001 | Schneck .................. G06F 21/10 705/54 |
| 6,507,845 B1 | 1/2003 | Cohen et al. |
| 6,519,700 B1 * | 2/2003 | Ram ...................... G06F 21/10 380/201 |
| 6,611,498 B1 | 8/2003 | Baker et al. |
| 6,613,098 B1 * | 9/2003 | Sorge .................... G06F 40/151 715/234 |
| 6,631,497 B1 * | 10/2003 | Jamshidi ............... G06F 16/258 715/205 |
| 6,691,281 B1 | 2/2004 | Sorge et al. |
| 6,701,485 B1 | 3/2004 | Igra et al. |
| 6,754,677 B1 | 6/2004 | Cho et al. |
| 6,763,464 B2 * | 7/2004 | Wang ...................... G06F 21/10 380/201 |
| 6,779,151 B2 | 8/2004 | Cahill et al. |
| 6,857,102 B1 | 2/2005 | Bickmore et al. |
| 6,898,760 B2 * | 5/2005 | Bedford ................. G06F 17/246 715/205 |
| 6,948,134 B2 | 9/2005 | Gauthier et al. |
| 6,973,619 B1 | 12/2005 | Hirose et al. |
| 6,988,241 B1 * | 1/2006 | Guttman ................. G06F 40/18 715/220 |
| 7,082,569 B2 | 7/2006 | Voshell |
| 7,162,528 B1 | 1/2007 | Simonoff et al. |
| 7,225,189 B1 * | 5/2007 | McCormack ......... G06F 17/246 |
| 7,233,951 B1 | 6/2007 | Gainer et al. |
| 7,275,209 B1 * | 9/2007 | Jones .................... G06F 17/211 715/234 |
| 7,296,219 B1 | 11/2007 | Guttman et al. |
| 7,383,272 B2 | 6/2008 | Krishnan et al. |
| 7,389,473 B1 * | 6/2008 | Sawicki ................. G06F 17/211 715/255 |
| 7,454,471 B2 * | 11/2008 | Sorge .................... G06Q 10/107 709/206 |
| 7,523,394 B2 * | 4/2009 | Jones .................... G06F 17/211 715/236 |
| 7,523,395 B1 | 4/2009 | Namait et al. |
| 7,584,268 B2 | 9/2009 | Kraus et al. |
| 7,584,419 B1 * | 9/2009 | Jones .................... G06F 17/211 715/234 |
| 7,640,506 B2 | 12/2009 | Pratley et al. |
| 7,657,571 B2 * | 2/2010 | Battagin .............. G06F 21/6254 715/744 |
| 7,904,323 B2 | 3/2011 | Wynn et al. |
| 8,578,399 B2 | 11/2013 | Khen et al. |
| 9,002,935 B1 * | 4/2015 | Ho ....................... G06F 16/9032 709/204 |
| 9,026,903 B1 | 5/2015 | Michael et al. |
| 9,501,463 B2 * | 11/2016 | Khen .................... G06F 16/9032 709/204 |
| 2001/0021926 A1 * | 9/2001 | Schneck ................. G06F 21/10 705/54 |
| 2002/0026478 A1 | 2/2002 | Rodgers et al. |
| 2002/0065848 A1 | 5/2002 | Walker et al. |
| 2002/0078074 A1 | 6/2002 | Cho et al. |
| 2002/0082857 A1 | 6/2002 | Skordin et al. |
| 2002/0091730 A1 * | 7/2002 | Bedford ................. G06F 17/246 715/212 |
| 2002/0091871 A1 | 7/2002 | Cahill |
| 2002/0129106 A1 | 9/2002 | Guffreund |
| 2002/0169799 A1 | 11/2002 | Voshell |
| 2002/0188629 A1 | 12/2002 | Burfoot |
| 2002/0194095 A1 | 12/2002 | Koren |
| 2002/0194485 A1 * | 12/2002 | Ram ...................... G06F 21/10 713/193 |
| 2003/0014513 A1 | 1/2003 | Ruths et al. |
| 2003/0028562 A1 | 2/2003 | Shaughnessy et al. |
| 2003/0055847 A1 | 3/2003 | Cho et al. |
| 2003/0088831 A1 * | 5/2003 | Bauer ................... G06F 16/93 715/809 |
| 2003/0105816 A1 | 6/2003 | Goswami |
| 2003/0105845 A1 | 6/2003 | Leermakers |
| 2003/0110191 A1 | 6/2003 | Handsaker et al. |
| 2003/0179230 A1 | 9/2003 | Seidman |
| 2003/0182621 A1 * | 9/2003 | Mazza ................. G06F 16/9558 715/226 |
| 2003/0226105 A1 * | 12/2003 | Waldau ................. H04L 67/02 715/212 |
| 2004/0088646 A1 | 5/2004 | Yeager et al. |
| 2004/0107224 A1 | 6/2004 | Bera |
| 2004/0131999 A1 | 7/2004 | Dresnick |
| 2004/0177321 A1 * | 9/2004 | Brown ................. G06F 17/2247 715/234 |
| 2004/0181748 A1 | 9/2004 | Jamshidi et al. |
| 2004/0210818 A1 * | 10/2004 | Jones .................... G06F 17/211 715/236 |
| 2004/0214560 A1 | 10/2004 | Date et al. |
| 2004/0220977 A1 | 11/2004 | Cho et al. |
| 2004/0237045 A1 | 11/2004 | Meltzer |
| 2004/0267871 A1 | 12/2004 | Pratley et al. |
| 2005/0055337 A1 | 3/2005 | Bebo et al. |
| 2005/0060342 A1 | 3/2005 | Farag |
| 2005/0097115 A1 * | 5/2005 | Bedford ................. G06F 40/18 |
| 2005/0108623 A1 * | 5/2005 | Bedford ................. G06F 40/18 715/208 |
| 2005/0246635 A1 | 11/2005 | Hirose et al. |
| 2005/0268215 A1 | 12/2005 | Battagin et al. |
| 2006/0004832 A1 | 1/2006 | Langsford et al. |
| 2006/0015805 A1 | 1/2006 | Humenansky et al. |
| 2006/0020673 A1 * | 1/2006 | Sorge .................... G06F 40/154 709/206 |
| 2006/0026502 A1 | 2/2006 | Dutta |
| 2006/0053380 A1 | 3/2006 | Spataro et al. |
| 2006/0080432 A1 | 4/2006 | Spataro et al. |
| 2006/0080596 A1 * | 4/2006 | Bhogal .................. G06F 9/542 715/213 |
| 2006/0112123 A1 | 5/2006 | Clark et al. |
| 2006/0179411 A1 | 8/2006 | Wolf et al. |
| 2006/0265396 A1 | 11/2006 | Raman et al. |
| 2006/0288286 A1 | 12/2006 | Chandler et al. |
| 2007/0050416 A1 * | 3/2007 | Battagin .............. G06F 21/6254 |
| 2007/0136666 A1 * | 6/2007 | Khen .................... G06Q 10/10 715/217 |
| 2007/0162840 A1 | 7/2007 | Rochelle et al. |
| 2007/0219956 A1 | 9/2007 | Milton |
| 2007/0220417 A1 | 9/2007 | Mathew et al. |
| 2009/0150761 A1 * | 6/2009 | Sawicki ................. G06F 17/24 715/216 |

(56) References Cited

U.S. PATENT DOCUMENTS

| 2009/0235087 A1 | 9/2009 | Bird |
| 2009/0235154 A1 | 9/2009 | Khen et al. |
| 2013/0007118 A1 | 1/2013 | Rochelle et al. |

FOREIGN PATENT DOCUMENTS

| JP | 2005018791 A | 1/2005 |
| JP | 2005353058 A | 12/2005 |
| JP | 200303103 | 1/2013 |

OTHER PUBLICATIONS

"Will the Office-Soft be Used Free of Charge on the Web?"; PC21, Jan. 2006. (English abstract enclosed.).
The Num Sum FAQ. Retrieved online: htto://web.archive.ora/web/20051125151514/htto://wvv'W.nurnsum.corn/about/faa Oct. 4, 2011.
Jody Gilbert et al. "75 Essential Excel tips", Feb. 2005, TechRepublic, Version 4.0, pp. 1-30.
McLeod, Bob, ""Can I get that as a Spreadsheet?"",http://web.archive.orq/web/20040205171439/http://www.15seconds.com/issue/031007.htm.
C. R. Palmer et al., ""Operation Transforms for a Distributed Shared Spreadsheet"", DatabaseInspec [Online], The Institution of Electrical Engineers, Stevenage, GB, 1998, Abstract only.
C. R. Palmer et al., ""Operation Transforms for a Distributed Shared Spreadsheet"", Proceedings ofACM 1998 Conference on Computer Supported Cooperative Work Nov. 14-18, 1998,Seattle, WA, pp. 69-78.
Mario Sixtus, "Das Netz erfindet sich neu: Ein Streifzug durch das Web 2.0" c't Magazin fur Computer Technik, vol. 2006, No. 5, Feb. 20, 2006, http://www.heise.de/cU06/05/144, 3 pages.
Mario Sixtus, The network re-invents: A stroll through the Web 2.0 c't Magazin fur Computer Technik, vol. 2006, No. 5, Feb. 20, 2006, machine translation of http://www.heise.de/cU06/05/144, 4 pages.
Mario Sixtus, "Das Netz erfindet sich neu: Ein Streifzug durch das Web 2.0" CT Magazin fur Computer Technik, vol. 2006, No. 5, Feb. 20, 2006, pp. 144-151.
Stowe, Michael, ""XML Spreadsheet Reference"", MSDN, Aug. 2001,http://msdn.microsoft.com/library/en-us/dnexcl2k2/html/odc xmlss.asp?frame=true.
Stowe, Michael, ""XML in Excel and the Spreadsheet Component"", MSDN, Aug. 2001,http://msdn.microsoft.com/librarv/en-us/dnexcl2k2/html/odc xlsmlinss.asp?frame=true.
Zhang Jianpei et al., ""Multimedia Information Sharing in the Heterogeneous Environment"",Database Inspec [Online], The Institution of Electrical Engineers, Stevenage, GB, 1997, Abstract only.
Zhang Jianpei et al., ""Multimedia Information Sharing in the Heterogeneous Environment"", 1997IEEE International Conference on Intelligent Processing Systems, Oct. 28-31, 1997, Beijing,China, pp. 1044-1046.
International Search Report and Written Opinion for corresponding International Application No. PCT/US2007/065608, dated Sep. 20, 2007, 11 pages.
Arrington, Michael, "Writely—Process Words with your Browser", Aug. 31, 2005. Retrieved from the internet: URL https://techcrunch.com/2005/08/31/writely-process-words-with-your-browsed [retrieved on Jan. 21, 2020].

* cited by examiner

```xml
<?xml version="1.0"?>
    <model XL2WebVersion="V4.48">
        <Creator Copyright="Google" Patent="Pending"/>
        <PublisherUsed name="Microsoft Excel" version="10.0" build="2614"/>
        <misc>
            <calculation iteration="100" tolerance="0.001" fullcalc="False"/>
        </misc>
        <books count="1" mainbook="Book1">
            <book name="Book1">
                <sheets count="3">
                    <sheet name="Sheet1" rows="7" columns="8">
                        <constants>
                            <fx r1="1" c1="4">Simple Illustration</fx>
                            <fx r1="3" c1="3">1</fx>
                            <fx r1="3" c1="4">2</fx>
                            <fx r1="3" c1="5">3</fx>
                            <fx r1="3" c1="6">4</fx>
                            <fx r1="3" c1="7">5</fx>
                            <fx r1="4" c1="3">5</fx>
                            <fx r1="4" c1="4">4</fx>
                            <fx r1="4" c1="5">3</fx>
                            <fx r1="4" c1="6">2</fx>
                            <fx r1="4" c1="7">1</fx>
                            <fx r1="3" c1="2">Input 1</fx>
                            <fx r1="4" c1="2">Input 2</fx>
                            <fx r1="5" c1="2">divide</fx>
                        </constants>
                        <formulas>
                            <fx r1="5" c1="3" r="1" c="5">=IF
                                (R5C2="add", SUM(R[-2]C:R[-1]C),
                                IF(R5C2="subtract",R[-2]C-R[-1]C,
                                IF(R5C2="multiply",R[-2]C*R[-1]C,
                                IF(R5C2="divide",R[-2]C/R[-1]C))))
                            </fx>
                        </formulas>
                    </sheet>
                    <sheet name="Sheet2" rows="1" columns="1">
                    <sheet name="Sheet3" rows="1" columns="1">
                </sheets>
                <namedFormulas count="0"/>
            </book>
        </books>
    <smartcells>
        <inputs count="0">
        <outputs count="0">
    </smartcells>
</model>
```

```
<?xml version="1.0"?>
  <model XL2WebVersion="V4.48">
      <Creator Copyright="Google" Patent="Pending"/>
      <PublisherUsed name="Microsoft Excel" version="10.0" build="2614"/>
      <misc>
        <title>PatentIllus</title>
        <header>
        <hideblankrows on="false"/>
        <tablelayoutfixed on="false"/>
        <usagetracking on="false"/>
        <customscriptoptions eventreginputs="false"
            eventlistinputs="false"/>
      </misc>
      <formatlists>
         <stylelists count="10">
            <style ID="1">font-family:Arial; font-size:10pt; color:#000000;
               background:#FFFFFF; text-align:left; vertical-align:bottom;
               width:48pt; height:15.7pt; </style>
            <style ID="2">font-family:Arial; font-size:10pt; color:#000000;
               background:#FFFFFF; text-align:left; vertical-align:bottom;
               width:48pt; height:13.5pt; </style>
            <style ID="3">font-family:Arial; font-size:10pt; color:#000000;
               background:#FFFFFF; text-align:left; vertical-align:bottom;
               width:48pt; height:12.7pt; </style>
            <style ID="4">font-family:Arial; font-size:10pt; color:#000000;
               background:#FFCC99; text-align:left; vertical-align:bottom;
               width:48pt; height:12.7pt; </style>
            <style ID="5">font-family:Arial; font-size:10pt; color:#000000;
               background:#FFCC99; text-align:left; vertical-align:bottom;
               width:48pt; height:13.5pt; </style>
            <style ID="6">font-family:Arial; font-size:10pt; color:#000000;
               background:#FFFF00; text-align:left; vertical-align:bottom;
               width:48pt; height:13.5pt; </style>
            <style ID="7">font-family:Arial; font-size:10pt; color:#000000;
               background:#CCFFCC; text-align:right; vertical-align:bottom;
               width:48pt; height:12.7pt; </style>
            <style ID="8">font-family:Arial; font-size:10pt; color:#000000;
               background:#CCFFCC; text-align:right; vertical-align:bottom;
               width:48pt; height:13.5pt; </style>
            <style ID="9">font-family:Arial; font-size:10pt; color:#000000;
               background:#FFFFFF; text-align:right; vertical-align:bottom;
               width:48pt; height:13.5pt; </style>
            <style ID="10">font-weight:bold; font-family:Arial; font-
               size:12pt; color:#000000; background:#FFFFFF; text-align:left;
               vertical-align:bottom; width:48pt; height:15.7pt; </style>
         </stylelists>
         <numberformatlists count="2">
            <numf ID="1">General</numf>
            <numf ID="2">0</numf>
         </numberformatlists>
         <scriptlists count="2">
            <script ID="1" type="drop">add, subtract, multiply,
     divide</script>
            <script ID="2" type="jscript">
            onChange='isTextValid(this,0,1,1,"")'</script>
         </scriptlists>
         <borderlists count="13">
```

FIG. 4A

```xml
<border ID="1">border-style:none; </border>
<border ID="2">border-color:#000000 #000000 #000000 #000000 ; border-
   style:solid solid solid solid ; border-width:2px 2px 1px 2px;
   </border>
<border ID="3">border-color:#000000 #000000 #000000 #000000 ; border-
   style:solid solid solid solid ; border-width:1px 2px 1px 2px;
   </border>
<border ID="4">border-color:#000000 #000000 #000000 #000000 ; border-
   style:solid solid solid solid ; border-width:1px 2px 3px 2px;
   </border>
<border ID="5">border-color:#000000 #000000 #000000 #000000 ; border-
   style:solid solid solid solid ; border-width:2px 1px 1px 2px;
   </border>
<border ID="6">border-color:#000000 #000000 #000000 #000000 ; border-
   style:solid solid solid solid ; border-width:1px 1px 2px 2px;
   </border>
<border ID="7">border-color:#000000 #000000 #000000 #000000 ; border-
   style:dotted solid solid solid ; border-width:0px 1px 3px 2px;
   </border>
<border ID="8">border-color:#000000 #000000 #000000 #000000 ; border-
   style:solid solid solid solid ; border-width:2px 1px 1px 1px;
   </border>
<border ID="9">border-color:#000000 #000000 #000000 #000000 ; border-
   style:solid solid solid solid ; border-width:1px 1px 2px 1px;
   </border>
<border ID="10">border-color:#000000 #000000 #000000 #000000 ; border-
   style:dotted solid solid solid ; border-width:0px 1px 3px 1px;
   </border>
<border ID="11">border-color:#000000 #000000 #000000 #000000 ; border-
   style:solid solid solid solid ; border-width:2px 3px 1px 1px;
   </border>
<border ID="12">border-color:#000000 #000000 #000000 #000000 ; border-
   style:solid solid solid solid ; border-width:1px 3px 2px 1px;
   </border>
<border ID="13">border-color:#000000 #000000 #000000 #000000 ; border-
   style:dotted solid solid solid ; border-width:0px 3px 3px 1px;
   </border>
</borderlists>
</formatlists>
<groups count="1">
 <group name="**All Sections" landscape="false"/>
</groups>
<iosections count="1">
 <iosection type="Mixed IO" name="Screen0"
     groupname="**All Sections" hidden="false">
   <values sht="Sheet1" r1="1" c1="1" r="7" c="8"/>
   <widths count="8">
     <width pts="48"/>
     <width pts="48"/>
     <width pts="48"/>
     <width pts="48"/>
     <width pts="48"/>
     <width pts="48"/>
     <width pts="48"/>
     <width pts="48"/>
   </widths>
   <heights count="7">
```

FIG. 4B

```
<height pts="15.75"/>
  <height pts="13.5"/>
  <height pts="12.75"/>
  <height pts="13.5"/>
  <height pts="13.5"/>
  <height pts="13.5"/>
  <height pts="12.75"/>
</heights>
<formats r="7" c="8">
  <tr>
      <td style="1" numf="1" border="1"/>
      <td style="1" numf="1" border="1"/>
      <td style="1" numf="1" border="1"/>
      <td style="10" numf="1" border="1" mergeright="5"/>
      <td style="10" numf="1" border="1"/>
      <td style="10" numf="1" border="1"/>
      <td style="1" numf="1" border="1"/>
      <td style="1" numf="1" border="1"/>
  </tr>
  <tr>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
  </tr>
  <tr>
      <td style="3" numf="1" border="1"/>
      <td style="4" numf="1" border="2"/>
      <td style="7" numf="1" script="2" border="5"/>
      <td style="7" numf="1" script="2" border="8"/>
      <td style="7" numf="1" script="2" border="8"/>
      <td style="7" numf="1" script="2" border="8"/>
      <td style="7" numf="1" border="11"/>
      <td style="3" numf="1" border="1"/>
  </tr>
  <tr>
      <td style="2" numf="1" border="1"/>
      <td style="5" numf="1" border="3"/>
      <td style="8" numf="1" script="2" border="6"/>
      <td style="8" numf="1" script="2" border="9"/>
      <td style="8" numf="1" script="2" border="9"/>
      <td style="8" numf="1" script="2" border="9"/>
      <td style="8" numf="1" border="12"/>
      <td style="2" numf="1" border="1"/>
  </tr>
  <tr>
      <td style="2" numf="1" border="1"/>
      <td style="6" numf="2" script="1" border="4"/>
      <td style="9" numf="1" border="7"/>
      <td style="9" numf="1" border="10"/>
      <td style="9" numf="1" border="10"/>
      <td style="9" numf="1" border="10"/>
      <td style="9" numf="1" border="13"/>
```

FIG. 4C

```
            <td style="2" numf="1" border="1"/>
        </tr>
        <tr>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
        </tr>
        <tr>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
        </tr>
      </formats>
   </iosection>
  </iosections>
</model>
```

FIG. 4D

|   | A | B | C | D | E | F | G | H | I |
|---|---|---|---|---|---|---|---|---|---|
| 1 |   |   |   |   |   |   |   |   |   |
| 2 |   |   |   |   |   |   |   |   |   |
| 3 |   |   |   |   |   |   |   |   |   |
| 4 |   |   |   |   |   |   |   |   |   |
| 5 |   |   |   |   |   |   |   |   |   |
| 6 |   |   |   | Simple Illustration |   |   |   |   |   |
| 7 |   |   |   |   |   |   |   |   |   |
| 8 |   | Input 1 | 1 | 2 | 3 | 4 | 5 |   |   |
| 9 |   | Input 2 | 5 | 4 | 3 | 2 | 1 |   |   |
| 10 |   | divide | 0.2 | 0.5 | 1 | 2 | 5 |   |   |

FIG. 5

CONVERTING SPREADSHEET APPLICATIONS TO WEB-BASED APPLICATIONS USING A DATA FILE THAT INCLUDES INTERACTIVITY ATTRIBUTES OF CELLS FOR THE WEB-BASED APPLICATIONS

RELATED APPLICATIONS

This application is a continuation of U.S. application Ser. No. 14/681,820, filed Apr. 8, 2015, which is a divisional of U.S. patent application Ser. No. 11/281,989 filed on Nov. 18, 2005, which claims priority from U.S. Provisional Patent Application Ser. No. 60/629,577, filed Nov. 19, 2004, entitled "System and Method for Converting Spreadsheet Applications to Web-Based Applications," the contents of which are hereby incorporated by reference.

BACKGROUND

A. Field of the Invention

The present disclosure relates generally to spreadsheet applications, and more specifically, to converting spreadsheet applications to web-based spreadsheet applications.

B. Description of the Related Art

Electronic spreadsheets are in widespread use in various industries including finance, business and academia. One of the reasons for their popularity is that spreadsheets greatly facilitate implementation of analytical and/or database applications. However, spreadsheets can present problems when they are distributed or when they are large files.

Distribution of spreadsheets often results in loss of control over the spreadsheets. For example, the receiver of the spreadsheet can easily modify it and redistribute the modified spreadsheet without authorization by the distributor. In addition, the receiver may be able to access proprietary data and/or formulas that the creator may not wish to give to the receiver. Although there are security measures available within current spreadsheet programs such as password protection, they can be defeated. Furthermore, spreadsheets of large size can also create problems when using them. Specifically, spreadsheets can be so large that having multiple spreadsheets active on one computer taxes resources of the computer, increasing the possibility of a computer crash.

SUMMARY

One aspect is directed to a method that includes receiving a spreadsheet application that is executable using a spreadsheet program; converting the spreadsheet application into a data file that defines characteristics of a networked version of the spreadsheet application that was converted from the spreadsheet application by applying permissions that are set in the spreadsheet application and not applied in the spreadsheet application, wherein the characteristics are defined based on the permissions and include information defining cells of the networked version of the spreadsheet application that are displayable to a user of the networked version of the spreadsheet application; and transmitting the data file to a server to make the data file available to network users as the networked version of the spreadsheet application.

Another aspect is directed to a non-transitory computer-readable medium storing instructions, the instructions comprising: one or more instructions which, when executed by a processor, cause the processor to: receive a spreadsheet application that is executable using a spreadsheet program; convert the spreadsheet application into a data file that defines characteristics of a networked version of the spreadsheet application that was converted from the spreadsheet application by applying permissions that are set in the spreadsheet application and not applied in the spreadsheet application, wherein the characteristics are defined based on the permissions and include information defining cells of the networked version of the spreadsheet application that are displayable to a user of the networked version of the spreadsheet application; and transmit the data file to a server to make the data file available to network users as the networked version of the spreadsheet application.

Yet another aspect includes a device that includes a memory to store instructions; and a processor to execute the instructions to: receive a spreadsheet application that is executable using a spreadsheet program; convert the spreadsheet application into a data file that defines characteristics of a networked version of the spreadsheet application that was converted from the spreadsheet application by applying permissions that are set in the spreadsheet application and not applied in the spreadsheet application, wherein the characteristics are defined based on the permissions and include information defining cells of the networked version of the spreadsheet application that are displayable to a user of the networked version of the spreadsheet application; and transmit the data file to a server to make the data file available to network users as the networked version of the spreadsheet application.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram illustrating an exemplary logic file created by the converter computer shown in FIG. 2;

FIGS. 4A-4D are diagrams illustrating an exemplary 10 file created by the converter computer shown in FIG. 2;

FIG. 5 is a diagram of an exemplary spreadsheet application that may be converted to create the logic files shown in FIGS. 3 and 4A-4D;

DETAILED DESCRIPTION

The following detailed description of the invention refers to the accompanying drawings. The detailed description does not limit the invention.

Overview

Implementations consistent with the principles of the invention relate to converting a spreadsheet application to a web-based spreadsheet application. The web-based spreadsheet application may exhibit substantially the same appearance and logic as the spreadsheet application. In one implementation, the conversion may be performed using extensible markup language (XML).

System Description

Figure 1:
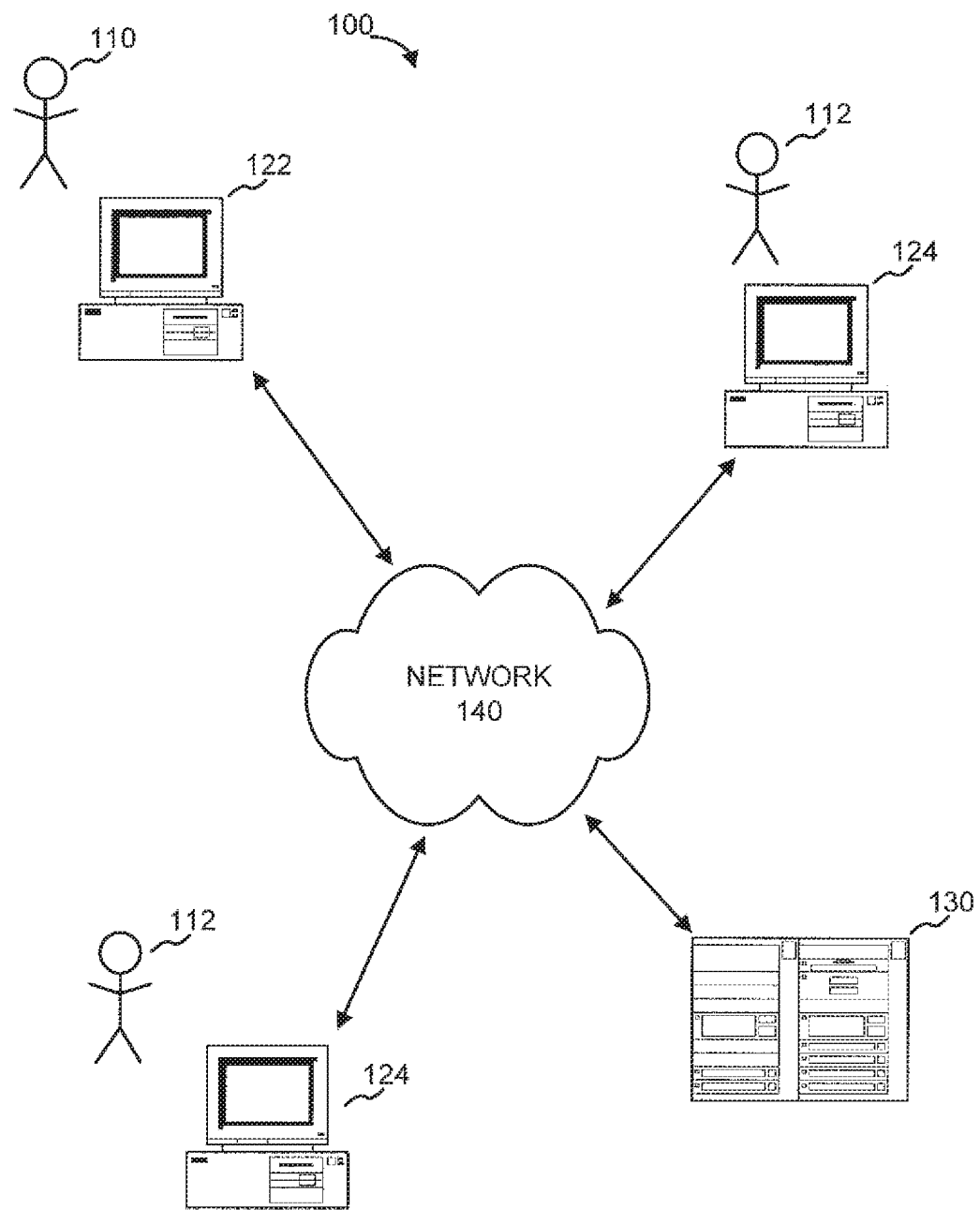
FIG. 1 is a diagram of an exemplary system in which concepts consistent with the principles of the invention may be implemented.

FIG. 1 is a diagram of an exemplary system 100 in which concepts consistent with the principles of the invention may be implemented. System 100 may include users 110 and 112, computers 122 and 124, a server 130, and network 140. User 110 will be described herein as a "user converter" that initiates conversion of a spreadsheet application to a web-based application using "converting" computer 122. Users 112 will be described herein as "user viewers" that may view and interact with the converted web-based application using "viewing" computers 124. One of ordinary skill in the art will recognize that more generally, a single user 110, 112 or computer 122, 124 can function as either or both of a converting user/computer or a viewing user/computer.

Network 140 may include the Internet, an intranet, a wireless network or other types of network alone or in combination. Server 130 may include one or more computing devices designed to interact or serve data to computers 122 and 124. Server 130 and computers 122 and 124 will be described in more detail below. It should be noted that although a single computer 122, two computers 124, a single network 140, and a single server 130 are shown in FIG. 1, in many practical implementations, a typical system 100 may include more of these components.

Figure 2:
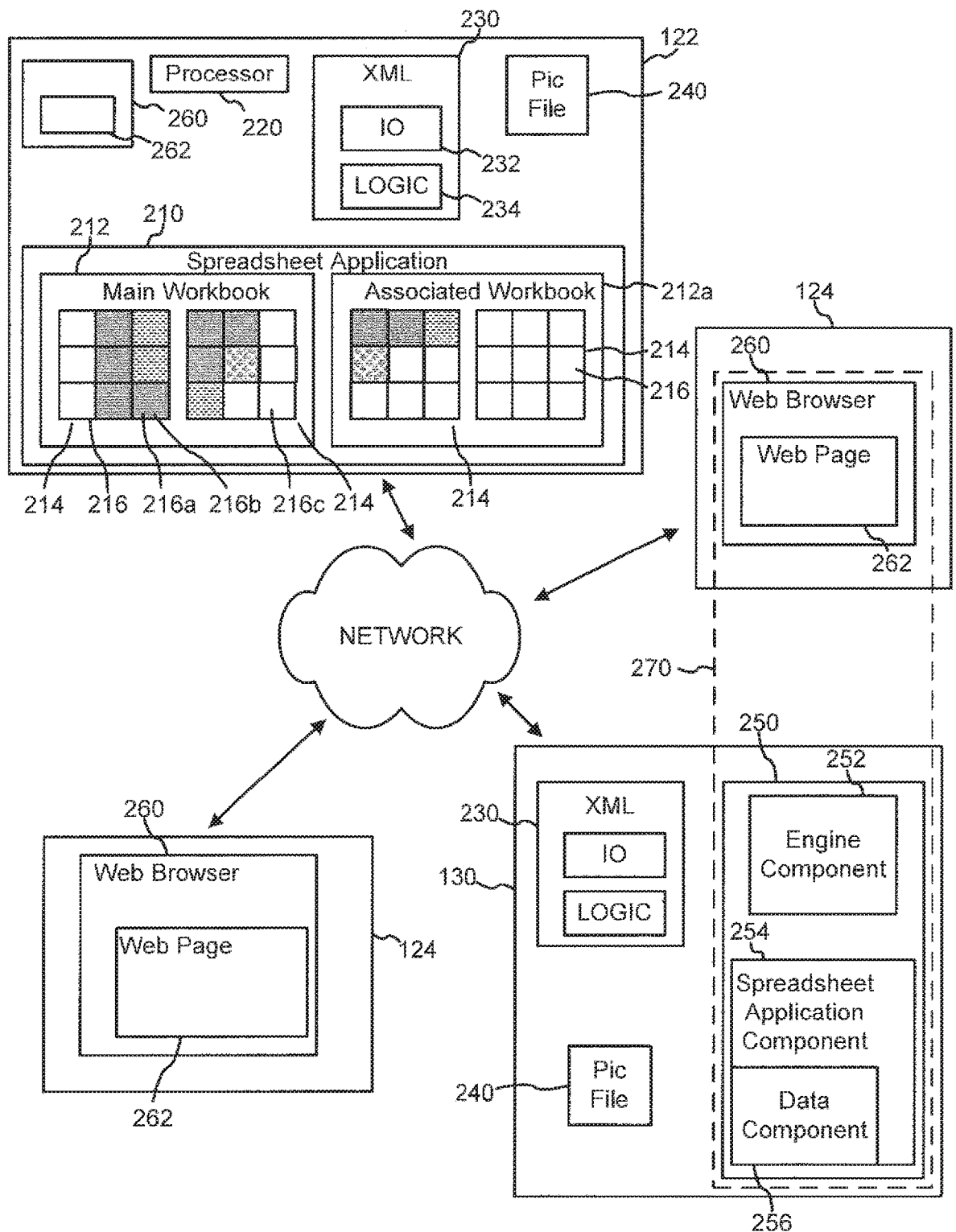
FIG. 2 is a block diagram illustrating an exemplary implementation of the computing devices shown in FIG. 1 in additional detail.

FIG. 2 is a block diagram illustrating an exemplary implementation of computers 122, 124 and server 130 in additional detail.

Converting Computer 122

As shown in FIG. 2, converting computer 122 includes spreadsheet application 210, processor 220, XML document 230, one or more picture files 240, and web browser 260. Processor 220 may include one or more processors that are used to execute the software programs, such as spreadsheet application 210 and web browser 260, that are executing at computer 122. Computer 122 may run a web browsing program such as web browser 260 that is capable of displaying a web page 262.

Spreadsheet application 210 may be a conventional spreadsheet application designed to execute and be used locally on a computer. Spreadsheet application 210 may be organized into a number of viewable sections, such as, for example, a main workbook 212 and one or more associated workbooks 212a. Each workbook 212, 212a may include one or more worksheets 214. Each worksheet 214, in turn, may include one or more cells 216. Cells 216 may be designated by user converter 110 as display cells 216a or smart cells 216c. Display cells 216a, in turn, may be designated by user converter 110 as to whether the cells are editable cells, shown as editable cells 216b. User converter 110 may, for instance, designate all display cells 216a as editable cells 216b or designate all cells 216 as display cells 216a.

Consistent with an aspect of the invention, spreadsheet application 210 may include an analytical application to assist in converting the spreadsheet to a web-based version of the spreadsheet. For example, spreadsheet application 210 may include the Microsoft Excel™ spreadsheet program, available from Microsoft Corporation, augmented with an add-on program to perform the conversion of Excel spreadsheets to a web-based spreadsheet 270. Other spreadsheet programs, such as the OpenOffice.org "Calc" spreadsheet program, may alternatively be used instead of Microsoft Excel™. Spreadsheet application 210 may also include or interact with other applications such as a database application or a modeling application.

Main workbook 212 may be used by user converter 110 to initiate a process to convert spreadsheet application 210 to web-based spreadsheet 270. Associated workbooks 212a may be workbooks that are referred to in formulas in main workbook 212. Display cells 216a may be cells 216 that user converter 110 designates as cells that are to be displayed to user viewer 112 in web-based application 270. Editable cells 216b may be display cells 216a that user converter 110 designates as cells whose content user viewer 112 may modify in web-based application 270. Smart cells 216c may be cells 216 that user converter 110 designates as cells that act as a data interface between web-based application 270 and other applications, such as user tracking applications or DLLs (dynamic link libraries). Smart cells 216c may use an interface such as the SOAP (simple XML-based protocol) interface to exchange data.

Each cell 216 may include logic, such as a constant, a formula, or other inputs permitted by spreadsheet application 210. In addition, each cell 216 may include one or more interactivity attributes that define ways that cell 216 interacts with the user, including how cell 216 is displayed to the user and how the user may modify the cell. Such attributes may comprise cell height, cell width, cell color, acceptable number input range, acceptable input format, dropdown lists, or other attributes that the spreadsheet application 210 uses to define the way cell 216 looks or how it may be manipulated by its user.

Converting computer 122 may collect logic information from each cell 216 and interactivity attribute information from each display cell 216a and convert that information into XML, resulting in XML document 230. XML document 230 may therefore include logic of cells 216 and interactivity attributes of display cells 216a within spreadsheet application 210. XML document 230 can be generally conceptualized as a data file that acts as an intermediary version of the spreadsheet application.

XML document 230 may include a logic file 234 and an input/output file (IO file) 232. An exemplary logic file 234 is shown in FIG. 3 and an exemplary IO file 232 is shown in FIGS. 4A-4D. Logic file 234 and IO file 232 are derived from the conversion of spreadsheet application 212. An exemplary spreadsheet application 210 that may be converted to obtain logic file 234 and IO file 232 is shown in FIG. 5.

Logic file 234 may include information regarding logic of each cell 216, including information regarding location of smart cells 216c. IO file 232 may include information regarding interactivity attributes of each display cell 216a, including information regarding location of editable cells 216b. In addition, IO file 232 may include information regarding charts located within ranges of display cells 216a so that charts can be recreated in web-based application 270. Such chart information preferably includes chart name, type of chart, sources of data series, colors of the chart, legend information, etc. It should be noted that because IO file 232 may collect interactivity attribute information from display cells 216a, including editable cells 216b, IO file 232 may include interactivity attribute information of only those parts of workbooks 212, 212a that user converter 110 wants displayed to user viewer 112 in the converted web-based spreadsheet application 270. Accordingly, user converter 110 is able to easily "hide" any selected portions of the spreadsheet from user viewer 112.

In one implementation, logic in spreadsheet application 210 may be abbreviated when constructing logic file 234. For example, if adjacent cells 216 contain similar logic, these cells may be grouped together in logic file 234 to describe their logic as a group rather than describing the logic of each cell individually. This concept is illustrated in section 310 of FIG. 3. In another implementation consistent with aspects of the invention, interactivity attribute information may be abbreviated for display cells 216a when constructing I/O file 232. For example, if adjacent display cells 216a contain similar interactivity attributes, these cells may be grouped together in I/O file 232 to describe their interactivity attributes as a group rather than describing interactivity of each cell individually.

Images in spreadsheet application 212 may be processed to obtain picture file(s) 240. Picture file(s) 240 may be referenced as an embedded object in 10 file 232 to indicate the name of picture file(s) 240.

Viewing Computer 124 and Server 130

XML file 230 and picture file 240 together contain information necessary to implement the web-based version of spreadsheet application 210. As shown in FIG. 2, XML file 230 and picture file 240 may be uploaded to server 130. Server 130 may implement computer program 250 to construct computer program objects according to information in XML document 230. Additionally, computer program 250 may work in conjunction with web browser 260 on viewing computer 124 to implement web-based application 270.

Server 130 may include XML document 230, one or more picture files 240 and computer program 250. Computer program 250, in turn, may include three components: engine component 252, spreadsheet application component 254 and data component 256. Computer program 250 and web browser 260 can be used to implement web-based application 270.

Engine component 252 of computer program 250 may convert XML document 230 into computer program objects. The objects may include spreadsheet application component 254 and data component 256, which together comprise interactivity attributes of display cells 216a and logic of cells 216. Using spreadsheet application component 254 and data component 256, engine component 252 directs data flow and calculations within computer program 250.

More specifically, web-based application 270 may be implemented by engine component 252 constructing abstract syntax trees (ASTs) using logic contained within spreadsheet application component 254 and data component 256. Each node of the ASTs may include a constant, a function, or a pointer depending on logic of spreadsheet application component 254 and/or data component 256. Engine component 252 may construct only those ASTs necessary to display calculation results in display cells 216a. Therefore, if there is logic contained in spreadsheet application component 254 or data component 256 that does not affect display cells 216a, engine component 254 may not construct ASTs corresponding to that logic. Engine component 252 preferably places the constructed ASTs in spreadsheet application component 254. Engine component 252 may construct new ASTs when user viewer 112 enters new data within web page 262 if the new data requires new ASTs for engine component 252 to perform calculations for displaying display cells 216a.

Figures 6A, 6B:
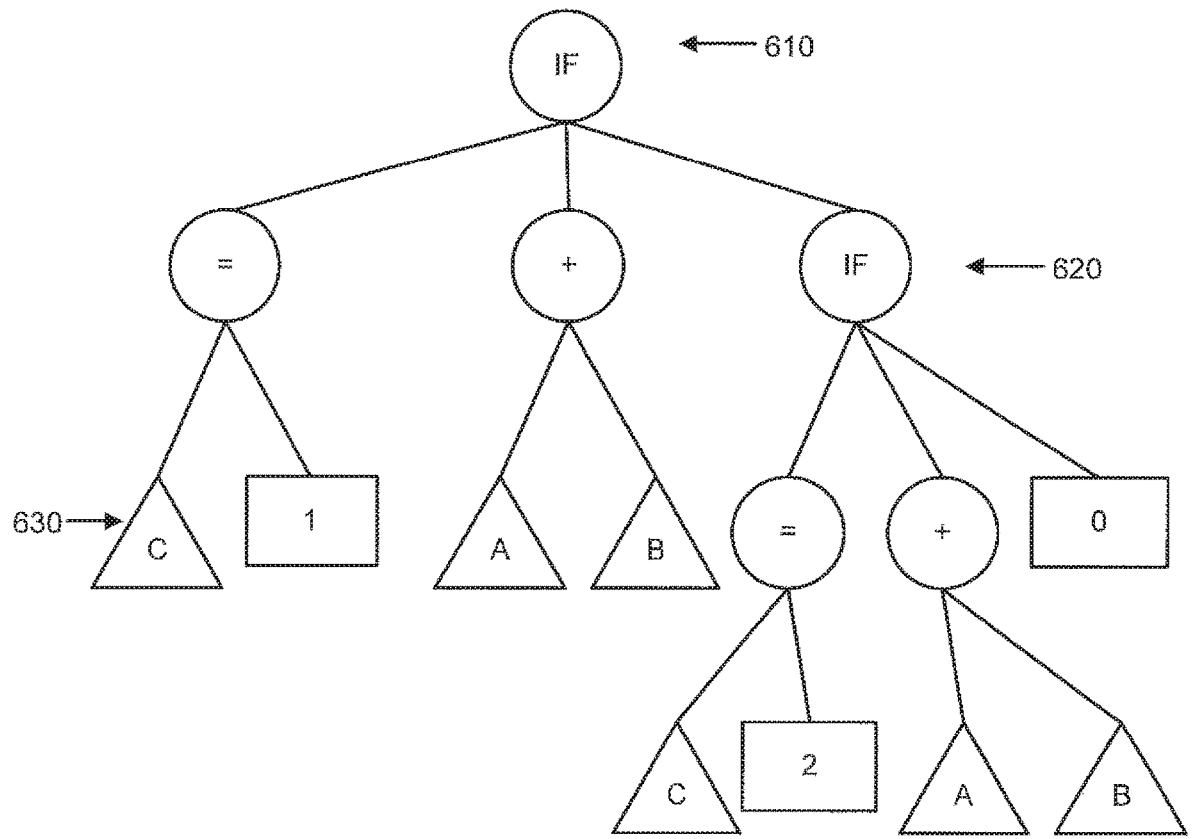
FIGS. 6A and 6B are diagrams illustrating exemplary abstract syntax trees (ASTs)
Figure 7A:
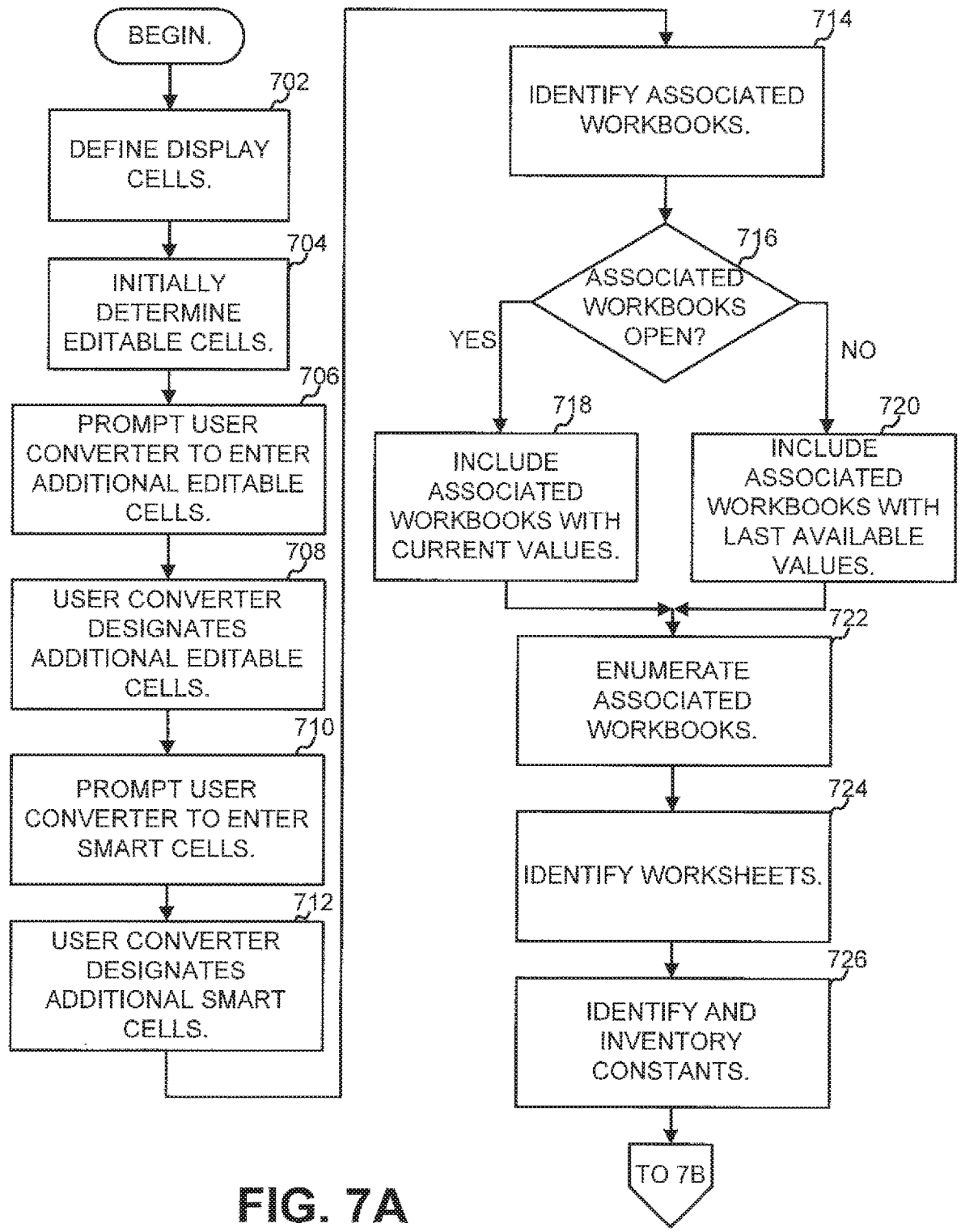
FIGS. 7A-7D are flow charts illustrating exemplary operation of the system shown in FIG. 1 in converting a spreadsheet application to a web-based application.
Figure 7B:
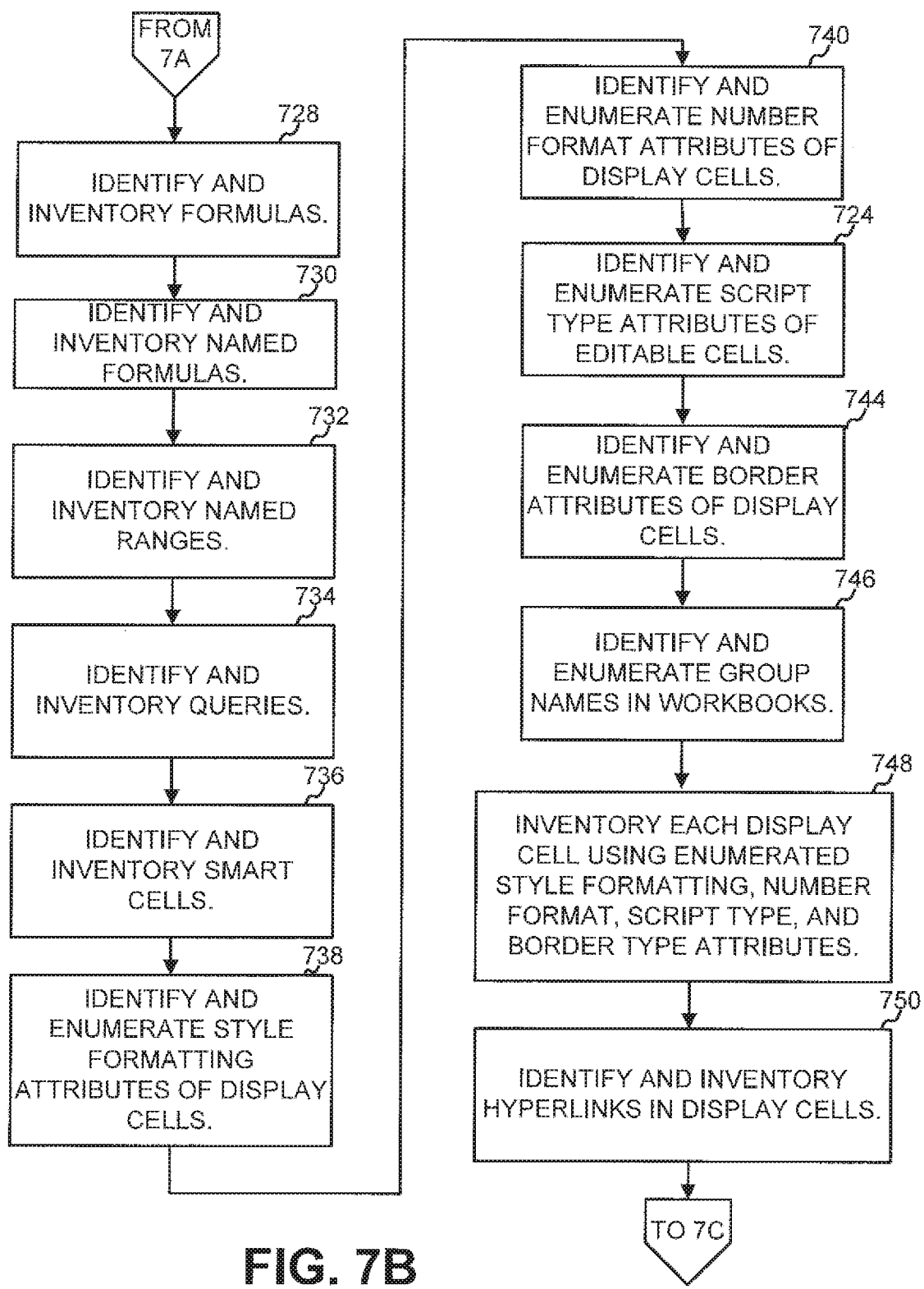
Figure 7C:
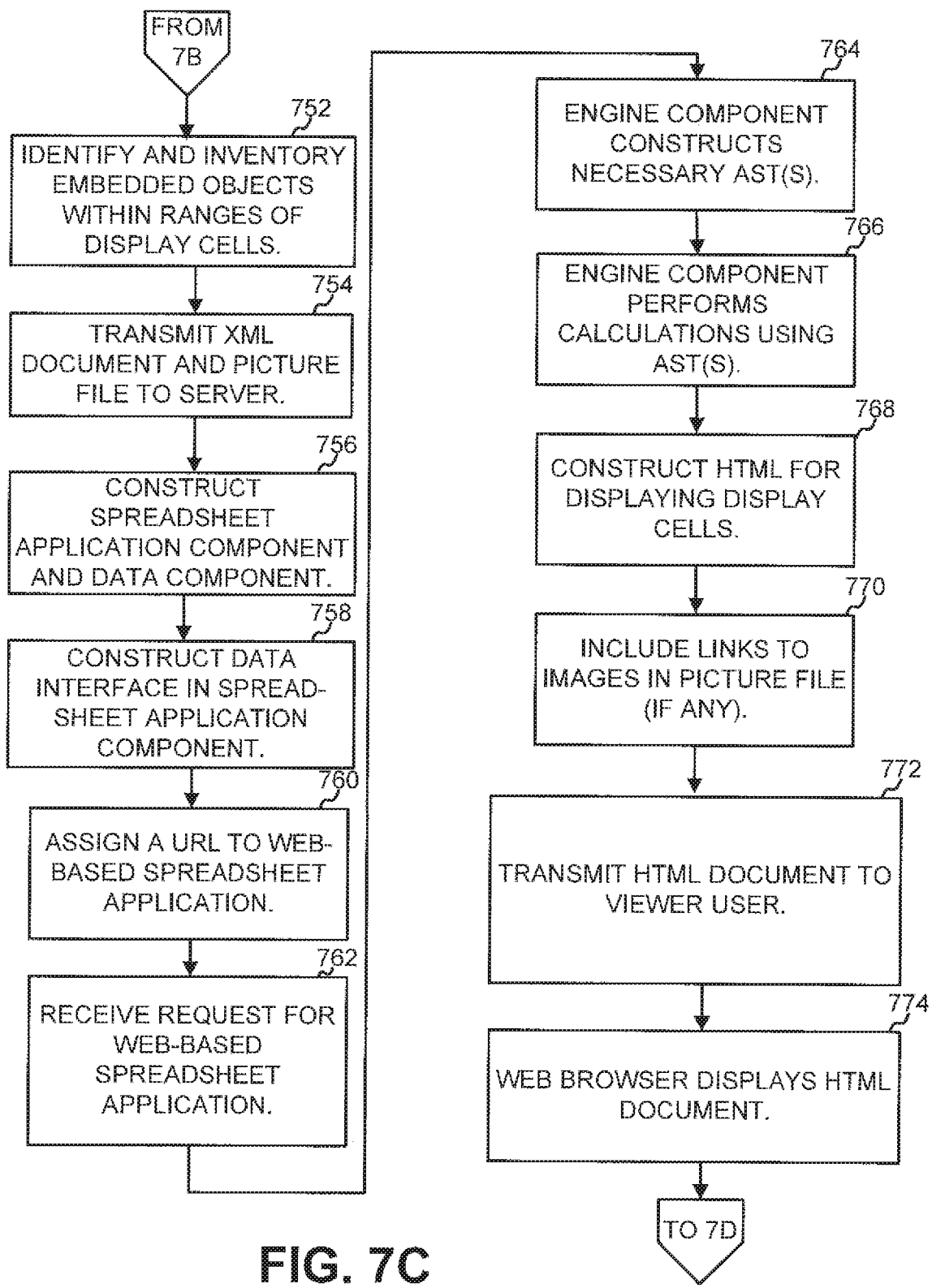
Figure 7D:
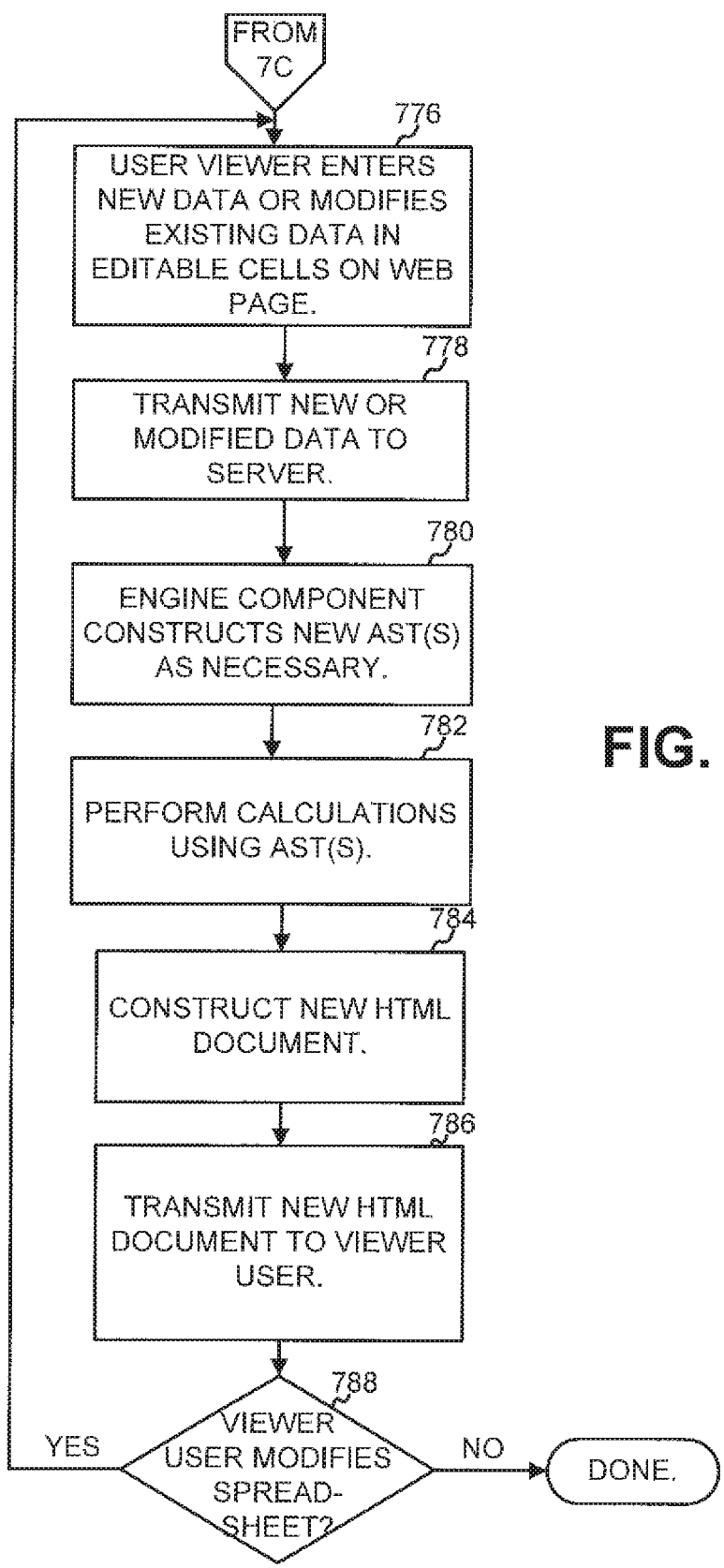

FIGS. 6A and 6B are diagrams illustrating exemplary ASTs. In FIG. 6A, four cells 601-604 are shown. Cells 601-603 each include a constant value and the AST for these cells is simply a single node containing the constant value of the cell. Cell 604, however, includes a function that references constants and other cells.

FIG. 6B is a diagram illustrating the AST for cell 604 in additional detail. Top level node 610 defines the function ("IF") of cell 604. Nodes 620 define the three sub-functions of the function in node 610. Namely, an equals function, a plus function, and another IF function. Nodes 630 relate to the functions defined by nodes 620. For the equals function, for instance, nodes 630 include the two arguments for the function: a pointer to the value in cell "C" (cell 603) and the constant 1. Similarly, for the plus function, nodes 630 define the two arguments as pointers to the values in cells "A" (cell 601) and "B" (cell 602). The IF function in nodes 620 is defined similarly to the IF function in node 610. That is, it includes three lower level nodes within nodes 630 (and any nodes dependent on these nodes).

Returning to FIG. 2, in one implementation, engine component 252 is written in JAVA and spreadsheet application component 254 and data component 256 include JAVA objects. It should be noted that engine component 252 may not change with different spreadsheets, but spreadsheet application component 254 and data component 256 can vary with different spreadsheet, since they are dependent on XML document 230. This type of software architecture is advantageous in that problems within computer program 250 are confined to spreadsheet application component 254 or data component 256 since engine component 252 is already known to operate properly.

Furthermore, computer program 250 may be designed to allow engine component 252 to simultaneously run multiple web-based applications 270. This is possible since web-based-application-specific information is confined to spreadsheet application components 254 and data component 256 objects. Engine component 252 may be capable of managing more than one set of spreadsheet application component 254 and data component 256 that correspond to different web-based applications 270.

User viewers 112 may view and interact with web-based application 270 using web browser 260. For example, computer program 250 may transmit HTML to web browser 260 which, in turn, displays web page 262 that may have substantially the same look and feel of corresponding portions of spreadsheet application 210. Therefore, web-based application 270 presents substantially the same look and feel of corresponding portions of spreadsheet application 210 as well as substantially the same logic as spreadsheet application 210.

One difference between spreadsheet application 210 and web-based application 270 is that user viewers 112 are not able to manually modify values within display cells 216a unless they are designated as editable cells 216b by user converter 110. Display cells 216a that are not editable cells 216b may be altered only by computer program 250 according to logic in spreadsheet application component 254 and/or data component 256.

If a user viewer 112 modifies or enters new data in editable cells 216b in web page 262 and requests a recalculation of web-based application 270, web browser 260 preferably transmits HTML of web page 262, including the new data, to computer program 250. Engine component 252 may then perform calculations with the new data using ASTs. Computer program 250 may construct new ASTs as required for calculations. Computer program 250 may then construct a new HTML page based on the results of the calculations. The new HTML page is transmitted to computer 124, where web browser 260 displays new web page 262. It should be noted that other types of markup language such as XML may be transmitted by computer program 250 to web browser 260.

In an alternative embodiment of the present invention, web-based application 270 may be set to an on-the-fly calculation mode. In this mode, as content of an editable cell is altered by user viewer 112, web browser 260 sends that piece of modified content to computer program 250 rather than the entire HTML of web page 262. This may be performed by including an event in the HTML that responds to any changes to the web page 262. In an another implementation, web browser 260 can be set to periodically send modified HTML to computer program 250 automatically. Engine component 252 performs calculations using ASTs, constructing new ASTs as necessary to complete the calculations. Then, rather than transmitting the entire set of HTML, computer program 250 transmits only the necessary HTML to web page 260 that modifies portions of web page 262 to reflect the new data and calculation results. In still another possible implementation, the user creator may decide that the entire spreadsheet application be converted to HTML instead of specifying certain sections.

The interaction between user viewer 112, web browser 260, web page 262 and computer program 250 may be carried out multiple times. In this way, web browser 260, web page 262 and computer program 250 work together as web-based application 270 that includes substantially the same appearance and logic as spreadsheet application 210 but with some user-application interactivity defined by user converter 110.

The operation of system 100 in converting a spreadsheet application to a web-based application will be described in more detail with reference to the flow charts of FIGS. 7A-7D. Display cells 216a may be defined in workbooks 212 and 212a at converting computer 122 (act 702). This may be done by defining ranges or by highlighting specific cells in workbooks 212 and 212a.

Cells within display cells 216a are initially determined that should be designated as editable cells 216b (act 704). As previously mentioned, an editable cell is one that allows user viewer 112 to modify or enter new data in the cell when interacting with web-based application 270. Cells that are likely to be editable cells may be inferred from the layout of the spreadsheet. User converter 110 may then be prompted to manually designate any additional editable cells 216b within display cells 216a (act 706). In response, if desired, user converter 110 may designate additional editable cells 216b (act 708). User converter 110 may be prompted to designate smart cells 216c so that computer program 250 is capable of exchanging data with other applications (act 710). User converter 110 may designate the smart cells 216c (act 712). In some implementations, smart cells 216c may be automatically determined.

Workbooks 212a that are associated with the main workbook 212 may be identified (act 714). As described above, main workbook 212 is associated with other workbooks 212a if main workbook 212 contains formulas that refer directly or indirectly to other workbooks. Formulas preferably can refer indirectly to other workbooks by referring to an entry in a workbook that, in turn, refers to another workbook. If any of associated workbooks 212a are open, the open associated workbook(s) 212a are included for conversion with their current values (acts 716 and 718). If an associated workbook 212a is not open, these associated workbooks 212a with last available values are included for conversion (acts 716 and 720).

In acts 722-736, logic information is collected from cells 216 and converted into XML, resulting in logic file 234 of XML document 230. The workbooks that are to be converted may be identified and enumerated (act 722). Worksheets 214 within these workbooks are also identified (act 724). For each workbook 212, 212a and each worksheet 214 within workbook 212, 212a, constants may be identified and inventoried within logic file 234 (act 726). For each workbook 212, 212a and each worksheet 214 within workbook 212, 212a, formulas may be identified and inventoried within logic file 234 (act 728).

For workbook 212, 212a and each worksheet 214 within workbook 212, 212a, named formulas, named ranges, queries and smart cells 216c may be respectively identified and inventoried (acts 730-736). Named formulas are formulas within workbooks 212, 212a that have assigned names. Similarly, named ranges may include groups of cells 216 within spreadsheet application 210 that have assigned names. Queries may be capable of obtaining data from outside of spreadsheet application 210 and placing the data within spreadsheet application 210. In one implementation, the data queried may reside in server 130 or is available in other servers.

In acts 738-750, interactivity attribute information from display cells 216a may be collected and converted into XML, resulting in 10 file 232 of XML document 230. In some implementations, 10 file 232 may be merged with or included as a part of logic file 234. Unique style formatting attributes of display cells 216a may be identified and enumerated in 10 file 232 (act 738). A style formatting attribute may be determined by attributes such as font-family, font-size, color, background, text-align, vertical-align, width and height, etc. Unique number format attributes of display cells 216a may be identified and enumerated in 10 file 232 (act 740). Unique script type attribute of editable cells 216b may be identified and enumerated in 10 file 232 (act 742). Existing border attributes of display cells 216a may also be identified and enumerated in 10 file 232 (act 744). A border attribute may include border-style, border-color and border-width.

Existing group names in workbooks 212, 212a may also be identified and inventoried in 10 file 232 (act 746). Group names may include names assigned to ranges of display cells 216a by user converter 110 so that each group represents a single web page 262 in web-based application 270. Each display cell 216a may be inventoried to obtain the enumerated style formatting, number format, script type, and border type attributes of display cells 216a (act 748). This information may be stored in 10 file 232. Hyperlinks within display cells 216a may be identified and inventoried (act 750). The hyperlinks may point to, for example, additional external web pages or to other sections of the spreadsheet. This information may be stored in 10 file 232. Embedded objects within ranges of display cells 216a may also be identified and inventoried (act 752). This information may be stored in 10 file 232. For embedded objects that are charts linked with data in spreadsheet application 210, converting computer 122 may indicate in 10 file 232 chart attributes such as chart type, source data series, legend information and other information necessary to recreate the chart in web-based application 270. For embedded objects that are images, converting computer 122 may convert that object into one or more picture files 240 and indicate names of picture files 240 as embedded objects in 10 file 232.

After assembling XML document 230 and picture files 240, as described above, converting computer 122 may transmit XML document 230 and picture files 240 (if any)

to computer program 250 of server 130 (act 754). As previously described, engine component 252 of computer program 250 constructs spreadsheet application component 254 and data component 256 based on information within XML document 230 (act 756). If smart cells exist, engine component 252 may construct data interfaces in spreadsheet application component 254 with which computer program 250 may exchange data with other applications residing in server 130 or other servers networked with server 130 (act 758).

A URL may be assigned to the web-based spreadsheet created by spreadsheet application component 254 and data component 256 (act 760). Server 130 may receive a request for the web-based spreadsheet from user viewer 112 via the URL (act 762). In response, engine component 252 may construct the ASTs necessary to calculate entries in display cells 216a using logic information contained in spreadsheet application component 254 and data component 256, and place the ASTs in spreadsheet application component 254 (act 764). Using the constructed ASTs, engine component 252 may then perform the calculations dictated by the spreadsheet (act 766). The calculations performed in act 766 may include all or substantially all of the calculations defined in the original spreadsheet, including numerical analysis functions and database access functions. Some of the calculations may be particularly suited to a networked environment. For example, the spreadsheet may include a filtering function that allows the user to limit the data shown by setting criteria in a data field, such as, for example, limiting a "date" field to only shown entries after a certain date.

The resultant version of the spreadsheet, including the calculated results and interactivity attribute information, may then be converted into an HTML document that displays display cells 216a (act 768). The HTML document may include links to any images in picture file 240 (act 770). The HTML document may then be transmitted to web browser 260, which, in turn, may display the HTML document as web page 262 to the viewer user 112 (acts 772 and 774). Web page 262 may include links to external items, such as images in picture file 240 from server 130. Web browser 260 may resolve these links and display the images as part of web page 262.

User viewer 112 may enter new data or modify existing data contained in display cells 216a when the display cells are designated as editable cells 216b (act 776). Web browser 260 may then transmit the new or modified data to computer program 250 (act 778). Engine component 252 may then construct new ASTs as necessary for calculations, including logic of smart cells 216c (act 780). Engine component 252 may then perform calculations according to the new ASTs (act 782). The updated version of the spreadsheet may be converted into HTML and transmitted back to viewer user 112 (acts 784 and 786). Acts 776-786 may be repeated each time the user modifies the web-based spreadsheet (act 788).

CONCLUSION

As described above, a web-based spreadsheet application can be automatically created from an existing "conventional" spreadsheet. The web-based spreadsheet can be uploaded to a server and presented to users. The web-based spreadsheet may provide a number of advantages over conventional spreadsheets. For example, formulas or other information in a spreadsheet that the spreadsheet author would like to hide from the viewer may reside only at the server and not be sent to the viewer, thus making it impossible for the viewer to learn this information. Additionally, because the calculations for the spreadsheet may be performed at the server, complex or large spreadsheets may still be displayed at the viewing computer without overburdening the viewing computer.

The foregoing description of exemplary embodiments of the invention provides illustration and description, but are not intended to be exhaustive or to limit the invention to the precise form disclosed. Modifications and variations are possible in light of the above teachings or may be acquired from practice of the invention. For example, while a spreadsheet application was primarily described herein as being created with a convention spreadsheet program, the spreadsheet application could itself have been directly created as an online or web-based application.

For example, while a series of acts have been described with regard to FIGS. 7A-7D, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a processor, a spreadsheet application that is executable using a spreadsheet program;
generating, by the processor, a data file that is used to convert the spreadsheet application to a networked version of the spreadsheet application, the data file including interactivity attributes for cells in the networked version of the spreadsheet application and information defining logical functions implemented by cells in the spreadsheet application, the interactivity attributes indicating at least one of how the cells in the networked version are to be displayed or whether the cells in the networked version are to be editable, wherein the generating of the data file comprises:
determining an associated workbook of the spreadsheet application referenced in the logic functions, the associated workbook being different from a main workbook including the cells in the spreadsheet application, determining whether the associated workbook is currently open,
in response to determining that the associated workbook is currently open, including, into the information defining the logic functions in the data file, a data structure that represents the associated workbook having cells with current values, and
in response to determining that the associated workbook is not currently open, including, into the information defining the logic functions in the data file, a data structure that represents the associated workbook having cells with last available values; and
transmitting, by the processor, the data file to a server to allow one or more client devices connected to the server to access the networked version of the spreadsheet application based on the data file.

2. The method of claim 1, wherein the networked version of the spreadsheet application is a web-based version of the spreadsheet application.

3. The method of claim 1, wherein the data file is an extensible markup language (XML) data file.

4. The method of claim 1, wherein the information regarding the interactivity attributes of the cells in the networked version are abbreviated.

5. The method of claim 1, wherein the logical functions include information defining formulas associated with the cells in the spreadsheet application.

6. The method of claim 1, wherein the logical functions include information defining data filtering functions.

7. The method of claim 1, wherein the logical functions include information defining a data interface between the spreadsheet application and other applications.

8. The method of claim 1, wherein the logical functions are abbreviated in the data file.

9. The method of claim 1, wherein the networked version of the spreadsheet application comprises the same logic as the spreadsheet application.

10. The method of claim 1, wherein the generating of the data file further comprises:
including, into the interactivity attributes of the data file, a first interactivity attribute for a first cell in the networked version instead of a second interactivity attribute of a second cell in the spreadsheet application, the first cell in the networked version corresponding to the second cell in the spreadsheet application, wherein the first interactivity attribute for the first cell in the networked version differs from the second interactivity attribute of the second cell in the spreadsheet application.

11. A non-transitory computer-readable medium storing instructions, the instructions comprising:
one or more instructions which, when executed by a processor, cause the processor to:
receive a spreadsheet application that is executable using a spreadsheet program;
generate a data file that is used to convert the spreadsheet application to a networked version of the spreadsheet application, the data file including interactivity attributes for cells in the networked version of the spreadsheet application and information defining logical functions implemented by cells in the spreadsheet application, the interactivity attributes setting indicating at least one of how the cells in the networked version are to be displayed or whether the cells in the networked version are to be editable, wherein to generate the data file, the processor is to:
determine an associated workbook of the spreadsheet application referenced in the logic functions, the associated workbook being different from a main workbook including the cells in the spreadsheet application,
determine whether the associated workbook is currently open,
in response to determining that the associated workbook is currently open, include, into the information defining the logic functions in the data file, a data structure that represents the associated workbook having cells with current values, and
in response to determining that the associated workbook is not currently open, include, into the information defining the logic functions in the data file, a data structure that represents the associated workbook having cells with last available values; and
transmit the data file to a server to allow one or more client devices connected to the server to access the networked version of the spreadsheet application based on the data file.

12. The computer-readable medium of claim 11, wherein the networked version of the spreadsheet application is a web-based version of the spreadsheet application.

13. The computer-readable medium of claim 11, wherein the data file is an extensible markup language (XML) data file.

14. The computer-readable medium of claim 11, wherein to generate the data file, the processor is further to:
include, into the interactivity attributes of the data file, a first interactivity attribute for a first cell in the networked version instead of a second interactivity attribute of a second cell in the spreadsheet application, the first cell in the networked version corresponding to the second cell in the spreadsheet application, wherein the first interactivity attribute for the first cell in the networked version differs from the second interactivity attribute of the second cell in the spreadsheet application.

15. A device comprising:
a memory to store instructions; and
a processor to execute the instructions to:
receive a spreadsheet application that is executable using a spreadsheet program;
generate a data file that is used to convert the spreadsheet application to a networked version of the spreadsheet application, the data file including interactivity attributes for cells in the networked version and information defining logical functions implemented by cells in the spreadsheet application, the interactivity attributes setting indicating at least one of how the cells in the networked version are to be displayed or whether the cells in the networked version are to be editable, wherein to generate the data file, the processor is to:
determine an associated workbook of the spreadsheet application referenced in the logic functions, the associated workbook being different from a main workbook including the cells in the spreadsheet application,
determine whether the associated workbook is currently open,
in response to determining that the associated workbook is currently open, include, into the information defining the logic functions in the data file, a data structure that represents the associated workbook having cells with current values, and in response to determining that the associated workbook is not currently open, include, into the information defining the logic functions in the data file, a data structure that represents the associated workbook having cells with last available values; and transmit the data file to a server to allow one or more client devices connected to the server to access the networked version of the spreadsheet application based on the data file.

16. The device of claim 15, wherein the networked version of the spreadsheet application is a web-based version of the spreadsheet application.

17. The device of claim 15, wherein the data file is an extensible markup language (XML) data file.

18. The device of claim 15, wherein to generate the data file, the processor is further to:

include, into the interactivity attributes of the data file, a first interactivity attribute for a first cell in the networked version instead of a second interactivity attribute of a second cell in the spreadsheet application, the first cell in the networked version corresponding to the second cell in the spreadsheet application, wherein the first interactivity attribute for the first cell in the networked version differs from the second interactivity attribute of the second cell in the spreadsheet application.

* * * * *